United States Patent [19]
Takahashi

[11] Patent Number: 5,910,867
[45] Date of Patent: Jun. 8, 1999

[54] MAGNETIC HEAD DEVICE WITH INTEGRALLY MOLDED CONDUCTIVE ELASTIC BODY AND RESIN BODY

[75] Inventor: Tomoyuki Takahashi, Miyagi, Japan

[73] Assignee: Sony Corporation, Tokyo, Japan

[21] Appl. No.: 08/814,120

[22] Filed: Mar. 10, 1997

Related U.S. Application Data

[60] Continuation of application No. 08/518,394, Aug. 23, 1995, abandoned, which is a division of application No. 08/448,528, Jun. 14, 1995, abandoned.

[30] Foreign Application Priority Data

Oct. 25, 1993 [JP] Japan .................................. 5-288681
Oct. 2, 1994 [JP] Japan .................................. 6-016844

[51] Int. Cl.[6] .............................. G11B 5/55; G11B 21/12
[52] U.S. Cl. ............................................................ 360/106
[58] Field of Search .................................... 360/103, 104, 360/105, 106, 114; 369/13

[56] References Cited

U.S. PATENT DOCUMENTS

| 3,349,384 | 10/1967 | Kohn | 360/104 |
|---|---|---|---|
| 4,189,759 | 2/1980 | Bauck et al. | 360/104 |
| 4,328,521 | 5/1982 | Pexton et al. | 360/105 |
| 4,343,025 | 8/1982 | Kronfeld et al. | 360/104 |
| 4,586,098 | 4/1986 | Pretto | 360/109 |
| 4,724,500 | 2/1988 | Dalziel | 360/104 |
| 4,750,066 | 6/1988 | Kunze | 360/104 |
| 4,759,119 | 7/1988 | Noguchi et al. | 29/603 |
| 5,016,130 | 5/1991 | Hashiguchi et al. | 360/104 |
| 5,126,903 | 6/1992 | Matsuzaki | 360/104 |
| 5,184,263 | 2/1993 | Fukakusa | 360/105 |
| 5,251,087 | 10/1993 | Sakashita et al. | 360/109 |
| 5,296,991 | 3/1994 | Fujita et al. | 360/121 |
| 5,402,397 | 3/1995 | Ohmori et al. | 369/13 |
| 5,459,629 | 10/1995 | Wakasugi | 360/104 |
| 5,467,237 | 11/1995 | Takahashi | 360/104 |

FOREIGN PATENT DOCUMENTS

| 2083971 | 6/1993 | Canada . |
|---|---|---|
| 0 544 302 A2 | 6/1993 | European Pat. Off. . |
| 0 549 144 A2 | 6/1993 | European Pat. Off. . |
| 0 566 998 A2 | 10/1993 | European Pat. Off. . |
| 3-119582 | 5/1991 | Japan . |
| 3-295080 | 12/1991 | Japan . |
| 5-81725 | 4/1993 | Japan . |
| 5-81726 | 4/1993 | Japan . |
| 5-128613 | 5/1993 | Japan . |
| 5-250750 | 9/1993 | Japan . |
| 5-258388 | 10/1993 | Japan . |
| 5-290428 | 11/1993 | Japan . |

OTHER PUBLICATIONS

Patent Abstracts of Japan, vol. 015, No. 140 (P–1188), Apr. 9, 1991 & JP–A–03 017806 (Canon Electron Inc), Jan. 25, 1991.
Patent Abstracts of Japan, vol. 017, No. 505 (P–1611), Sep. 10, 1993 & JP–A–05 128613 (Sony Corp) May 25, 1993.

Primary Examiner—David L. Ometz
Attorney, Agent, or Firm—Limbach & Limbach L.L.P.

[57] ABSTRACT

A magnetic head which is slidably in contact with a magneto-optical recording medium, at the time of carrying out recording of information signals onto the magneto-optical recording medium. This magnetic head includes a magnetic core; a bobbin having an insertion hole into which the magnetic core is inserted, a recessed portion within which a coil is formed in a manner to surround the insertion hole, and a flange portion formed in a direction perpendicular to the length direction of the magnetic core; a slidable contact body having an attachment hole opened at one end for attaching the magnetic core and the bobbin; and a regulating arm for limiting movement of the contact body away from but not toward the recording medium. Further, an engagement portion is formed at either one of the bobbin and the slidable contact body, and a portion to be engaged is formed at the other member. The engagement portion and the portion to be engaged are engaged with each other, whereby the bobbin and the slidable contact body are integrated without use of a bond.

12 Claims, 13 Drawing Sheets

MAGNETIC HEAD DEVICE WITH INTEGRALLY MOLDED CONDUCTIVE ELASTIC BODY AND RESIN BODY

This is a continuation of application No. 08/518,394 filed on Aug. 23, 1995 now abandoned, which is a divisional application of application No. 08/448,528 filed on Jun. 14, 1995 now abandoned.

BACKGROUND OF THE INVENTION

1. Technical Field

This invention relates to a magnetic head used in a recording/reproducing apparatus using, as a recording medium, a magneto-optical recording medium such as a magneto-optical disc. The invention further relates to a magnetic head device provided with such a magnetic head, and more particularly to a magnetic head, for use with a magneto-optical recording medium where information signals are recorded, slidably in contact therewith and a magnetic head device provided with such a magnetic head.

2. Description of Related Art

Hitherto, there has been employed a magneto-optical disc recording/reproducing apparatus using, as a recording medium, magneto-optical disc in which a magneto-optical recording layer composed of a perpendicular magnetization film is provided on a transparent substrate (base member) which is transparent to light.

Such a magneto-optical recording/reproducing apparatus has a structure in which an optical pick-up device (unit) for emitting light beams irradiated onto a magneto-optical recording layer is oppositely disposed at one surface side of the magneto-optical disc. The magneto-optical disk is rotationally operated by a disc drive mechanism. A magnetic head device (unit) for applying an external magnetic field to the magneto-optical recording layer is oppositely disposed at the other surface side of the magneto-optical disc.

The magneto-optical disc recording/reproducing apparatus serves to apply a magnetic field in which the direction of the magnetic field is modulated in accordance with an information signal to be recorded from the magnetic head unit to the magneto-optical recording layer of the magneto-optical disc and to converge light beams emitted from the optical pick-up unit to the magneto-optical discs. In this way, portion of the disk is heated beyond the Curie temperature by irradiation of light beams so that the coercive force disappears. The disc can then be magnetized in accordance with the direction of the magnetic field applied from the magnetic head unit. After this magnetization, light beams are moved relative to the magnetized portion of the disc by rotation of the magneto-optical disc so that the temperature is lowered to less than Curie temperature, whereby the direction of the magnetization is fixed. Thus, recording of information signal is carried out.

Meanwhile, in the conventional magneto-optical disc recording/reproducing apparatus, at the time of recording an information signal, a magnetic head is opposed to a magneto-optical disc rotationally operated with a fixed spacing therebetween in such a manner that the magnetic head is not in contact with the magneto-optical disc. The reason why such an approach is employed is to prevent the magnetic head (with a core of metal such as ferrite) from damaging the magneto-optic disc by sliding contact between the magneto-optical disc and the head.

In view of the above, in the conventional magnetic head device, there is provided an electromagnetic control mechanism for allowing the magnetic head to undergo displacement following surface vibration of the magneto-optical disc so that the magnetic head can hold a fixed spacing without being in contact with the magneto-optical disc even in the case where surface vibration takes place. Such contact is prevented even when the magneto-optical disc is rotationally operated, and subject to warp (warpage) and/or unevenness of thickness of the magneto-optical disc.

In the magnetic head device provided with electromagnetic control mechanism for allowing spacing between the magnetic head and the magneto-optical disc to be kept fixed, power for driving the electromagnetic control mechanism is required, leading to increase in power consumption. Further, a detecting mechanism for detecting spacing between the magnetic head and the magneto-optical disc is also required. As a result, not only the mechanism for controlling the magnetic head device becomes complicated, but also the configuration of the recording/reproducing apparatus becomes complicated. Thus, it is extremely difficult to allow the apparatus itself to be small-sized and of 25% thin plate structure.

In view of the above, there has been proposed a magneto-optical disc recording/reproducing apparatus provided with a magnetic head device for carrying out recording of an information signal in the state where the magnetic head is caused to be slidably in contact with the magneto-optical disc. This magnetic head device in slidable contact with the disc replaces the magnetic head device which maintains a fixed spacing from the disc.

As a magnetic head device used in the magneto-optical disc recording/reproducing apparatus of this kind, there is a magnetic head device described in the Japanese Patent Application Laid Open No. 290428/1993 publication.

As the magnetic head device described in the above-mentioned publication, there is a magnetic head device as constructed as shown in FIGS. 1 and 2.

This magnetic head device includes, as shown in FIGS. 3 and 4, a magnetic head 6 composed of a magnetic head element 4 having a magnetic core 1 composed of a magnetic material such as ferrite, etc. and a bobbin 3 on which a coil 8 is wound, and a slidable contact body 5 to which the magnetic head element 4 is attached.

The magnetic core 1 constituting the magnetic head element 4 includes a center magnetic pole core 1a, a pair of side magnetic pole cores 1b, 1b provided on the both sides of the center magnetic pole core 1a, and connecting portion 1c connecting the base end sides of these magnetic pole cores 1a, 1b, 1b. The magnetic core 1 is formed substantially E-shaped as a whole.

The bobbin 3 includes, as shown in FIG. 3, flange portions 3a, 3b at the upper and lower both ends, and is provided with insertion hole 7 through which the center pole core 1a of the magnetic core 1 is inserted in a manner to penetrate through the both flange portions 3a, 3b. At the upper flange portion 3a of bobbin 3, there are provided in a projected manner (hereinafter simply referred to as "projected" depending upon circumstances) a pair of connection pins 9, 9 to which connection terminals of the coil 8 wound between both flange portions 3a, 3b are connected.

By inserting the center magnetic pole core 1a of the magnetic core 1 into the insertion hole 7 to allow the coil 8 to be wound on the periphery of the center magnetic pole core 1a thus to allow the bobbin 3 to be integrated with the magnetic core 1, the magnetic head element 4 is constituted. At this time, a pair of side magnetic pole cores 1b, 1b of the magnetic core 1 are caused to be opposite to each other with respect to the outer circumferential surface of the coil 8 wound on the bobbin 3.

The slidable contact body 5 is formed by molding synthetic material of low friction coefficient, and is provided, as shown in FIG. 3, with a magnetic head attachment (mounting) portion 10 in which the magnetic head element 4 is attached (mounted) on the base end side. A slidable contact portion 11 slidably in contact with the magneto-optical disc from the front end side of the magnetic head attachment portion 10 is integrally formed in a projected manner. At the magnetic head attachment portion 10 provided at the slidable contact body 5, there is provided a fitting recessed portion 12 in which the magnetic head element 4 is fitted and disposed. This fitting recessed portion 12 is formed with the surface side opposite to the magneto-optical disc being as opening end. A fitting hole 13 into which connecting portion 1c of the magnetic core 1 is fitted is bored at the bottom surface portion. Further, at the bottom surface portion, there are bored through holes 14 for allowing connection pins 9, 9 provided at the bobbin 3 to be projected from the slidable contact body 5. As shown in FIG. 3, the through holes 14 bored continuously with the fitting hole 13.

Further, the magnetic head element 4 is attached, as shown in FIG. 4, to the magnetic head attachment portion 10 by allowing the connecting portion 1c of the magnetic core 1 to be fitted into the fitting hole 13 and allowing the connection pins 9, 9 to be projected from the through holes 14 so that they are fitted into the fitting recessed portion 12. At this time, magnetic head element 4 is connected within the fitting recessed portion 12 by means of bond (adhesive agent) so that it is prevented from slipping off from the magnetic head attachment portion 10. Alternatively, there is employed a method in which, which makes use of the fact that the slidable contact body 5 is formed by synthetic resin. Specifically, heat caulking can be used to thermally deform the opening end side of the fitting recessed portion 12, thereby fixing the magnetic head element 4 within the fitting recessed portion 12.

Moreover, the slidable contact portion 11 is provided in such a manner that it is projected from the front end side of the magnetic head attachment portion 10, and is formed in such a manner to swell a slidable contact surface 15 slidably in contact with the magneto-optical disc from the surface opposite to the magneto-optical disc of the magnetic head attachment portion 10. On the upper surface opposite to the slidable contact surface 15 of the slidable contact portion 11, a fitting projection 17 for attaching the magnetic head 61 to a leaf spring 16 for elastically (resiliently) and displaceably supporting it is provided in a projected manner. This fitting projection 17 is projected on a pedestal 18 inclined relative to the upper surface of the slidable contact portion 11 in order that the front end side of the slidable contact portion 11 is projected to the magneto-optical disc side when the magnetic head 6 is attached to the leaf spring 16 as shown in FIG. 2.

The magnetic head 6 constituted as described above is attached, as shown in FIGS. 1 and 2, to a magnetic head attachment (mounting) portion 20 formed at the front end side of the leaf spring 16 of which the base end side is fixedly supported by the head supporting arm 19.

The leaf spring 16 to which the magnetic head 6 is attached is of a structure as shown in FIG. 1 such that there is bored a cut portion 21 to which the magnetic head attachment portion 10 of the slidable contact body 5 in which the magnetic head element 4 is attached facing the front end side is faced, and the magnetic head attachment portion 20 is provided at the front end sides of a pair of supporting arms 22, 22 extending from both sides of the cut portion 21. This magnetic head attachment portion 20 is connected, on both opposites, to the front end sides of the supporting arms 22, 22 through narrow supporting portions 23, 23 adapted to easily undergo elastic (resilient) displacement.

The magnetic head 6 is attached to the leaf spring 16 by allowing the magnetic head attachment portion 10 of the slidable contact body 5 to be facing to the cut portion 21, and allowing the fitting projection 17 projected on the upper surface of the slidable contact body 11 to be fitted into a fitting hole 24 bored in the magnetic head attachment portion 20.

The magnetic head 6 attached to the leaf spring 16 in this way is caused to undergo elastic (resilient) force of the leaf spring 16 so that it can be in contact with the magneto-optical disc. When the magnetic head 6 comes into contact with the magneto-optical disc, the slidable contact portion 11 of the front end side of the slidable contact body 5 first comes into contact with the magneto-optical disc. Then, the magnetic head 6 is caused to undergo biasing force of the leaf spring 16 so that it comes into pressure-contact with the magneto-optical disc. As a result, the supporting portions 23, 23 for supporting the magnetic head attachment portion 20 are deformed in such a manner that they are twisted. Thus, the slidable contact portion 11 of the front end side of the slidable contact body 5 comes into slidable contact with the slidable contact surface in such a manner to follow (become in conformity with) the principal surface of the magneto-optical disc.

In this example, when the slidable contact portion 11 is slidably in contact with the principal surface of the magneto-optical disc in such a manner to follow it, the slidable contact body 5 rotates with the direction perpendicular to the length direction of the leaf spring 16. The supporting portions 23, 23 define the axis of this rotation. For this reason, at one side of the slidable contact body 5, there are projected a pair of rotation limit pieces 25, 25 for limiting the rotational displacement when the slidable, contact body 5 is caused to undergo rotational displacement about the axis defined by the supporting portions 23, 23 and for limiting excessive torsion (twisting) of the supporting portions 23, 23. These pair of rotation limit pieces 25, 25 are extended, as shown in FIG. 2, at upper and lower portions of one supporting arm 22 provided at the leaf spring 16. When the slidable contact body 5 is caused to undergo rotational displacement, the rotation limit pieces 25, 25 come into contact with the supporting arm 22 so that excessive rotation of the slidable contact body 5 is limited.

Meanwhile, power supply to the coil 2 of the magnetic head 6 attached at the front end side of the leaf spring 16 is carried out through a flexible wiring substrate 26 extended onto the leaf spring 16. This flexible wiring substrate 26 is fixed on the leaf spring 16 by allowing an engagement hole 27 to be engaged with a cutting raising piece 26b formed by cutting and raising a portion of the leaf spring 16 so that the cutting raising piece 26b is bent. (folded). In addition, the flexible wiring substrate 26 and the coil 8 are electrically connected by inserting land portions formed at the end portions of wiring patterns 26a formed on the flexible wiring substrate 26 into the connection pins 9, 9 projected on the upper surface of the slidable contact body 5 by soldering thereto.

The magnetic head constituted as described above is fixed by using bond in the case where the magnetic head element is attached to the slidable contact body. For this reason, attachment work for attaching the magnetic head element to the slidable contact body can be troublesome, and also it is difficult to precisely maintain attachment position a accuracy with respect to the slidable contact body of the magnetic head element.

Moreover, in the case where the magnetic head element is attached to the slidable contact body, even in the case where there is employed thermal (heat) caulking method of thermally deforming magnetic head attachment portion to fix it, attachment work for attaching the magnetic head element to the slidable body can still be troublesome.

Further, in the case of the above-described magnetic head, since connection between the magnetic head and the recording control section of information signal is carried out by using the flexible wiring substrate, electric connection between the flexible wiring substrate and the connection pins is carried out by soldering. For this reason, soldering work is required for assembling the magnetic head. As a result, the assembly work can be troublesome, and also rapid assembling cannot be carried out.

SUMMARY OF THE INVENTION

In view of the above, an object of this invention is to provide a magnetic head which can be assembled without use of a connecting material such as bond, etc., and without heating the slidable contact body to which the magnetic head element is attached.

Another object of this invention is to provide a magnet head which can be assembled with high assembling accuracy.

A further object of this invention is to provide a magnetic head which can be assembled by simple assembling operation.

A further object of this invention is to provide a magnetic head which permits connection with respect to an electric circuit such as a recording control section, etc. of the information signal without use of a solder.

A further object of this invention is to provide a magnetic head which can automatically carry out electric connection between the magnetic head element and the power supply terminal by assembling into the slidable contact body of the magnetic head element.

A further object of this invention is to provide a magnetic head device which can electrically connect between the magnetic head and the external circuit such as the recording control section, etc. for the information signal without use of separate conductive wiring (body) such as the flexible wiring substrate, etc.

A still further object of this invention is to provide a magnetic head device for which assembly is easy.

A further object of this invention is to provide a magnetic head device in which the magnetic head is attached to the supporting body, thereby making it possible to simultaneously realize mechanical connection and electric connection between the magnetic head and the support body.

This invention is directed to a magnetic head which is designated to operate in slidable contact with a magneto-optical recording medium. This magnetic head includes a core, a bobbin on which a coil is attached, and a slidable contact body where an attachment hole for attaching the core and the bobbin is formed. Further, an engagement portion is formed at either one of the bobbin and the slidable contact body and a portion to be engaged (hereinafter referred to as "engaged portion" as occasion demands) is formed at the other member, whereby the engagement portion and the engaged portion are engaged with each other so that the bobbin is integrally attached to the slidable contact body.

Moreover, a magnetic head according to this invention includes a core, and a bobbin which has an insertion hole into which the core is inserted, a recessed portion having a coil which surrounds the insertion hole and a flange portion formed in a direction perpendicular to the length direction of the core at one end portion. The magnetic head further includes a slidable contact body with an attachment hole at one end for attaching the core and the bobbin and at feast either one of the peripheral edge of the attachment hole and one surface of the flange portion of the bobbin attached within the attachment hole constitutes a slidable contact surface of the magneto-optical recording medium. Further, the engagement portion is formed at either one of the bobbin and the slidable contact body, and a portion to be engaged is formed at the other member, whereby the engagement portion and the engaged portion are engaged with each other so that the bobbin is attached to the slidable contact body.

Further, this invention is directed to a magnetic head device which is used in recording of the magneto-optical recording medium such that it is slidably in contact therewith. This magnetic head device has a magnetic head composed of a core and a coil bobbin on which the coil is attached, and a slidable contact body to which the core and the coil bobbin of the magnetic head are attached. The magnetic head device further includes an elastic conductive (resilient) body property for elastically (resiliently) supporting the slidable contact body in order that the slidable contact body is, slidably in contact with the magneto-optical recording medium electrically connected to the coil, and a supporting body of resin in which the elastic body is integrally molded.

Here, the slidable contact body is such that the portion in the vicinity of the center of gravity position of the slidable contact body is supported by the supporting body under the state where the magnetic head is attached to the slidable contact body by the supporting body.

In addition, the slidable contact body further includes a fixed portion, wherein a first elastic (resilient) displacement portion is formed between the fixed portion and the supporting portion, and a second elastic (resilient) displacement portion 15 formed between the supporting portion and the slidable contact body.

DESCRIPTION OF PREFERRED EMBODIMENT AND BEST MODE FOR CARRYING OUT THE INVENTION

More practical embodiments of a magnetic head and a magnetic head device according to this invention will now be described with reference to the attached drawings.

The magnetic head according to this invention will be first described.

This magnetic head 31 is used in a magneto-optical disc recording/reproducing apparatus using, as a recording medium, a magneto-optical disc in which a magneto-optical recording layer composed of a perpendicular magnetic film is provided on a transparent substrate having light transparency. The magnetic head 31 is used under the state where it is slidably in contact with one principal surface of the magneto-optical disc rotationally operated, when recording of an information signal is carried onto the magneto-optical disc.

Figure 1:
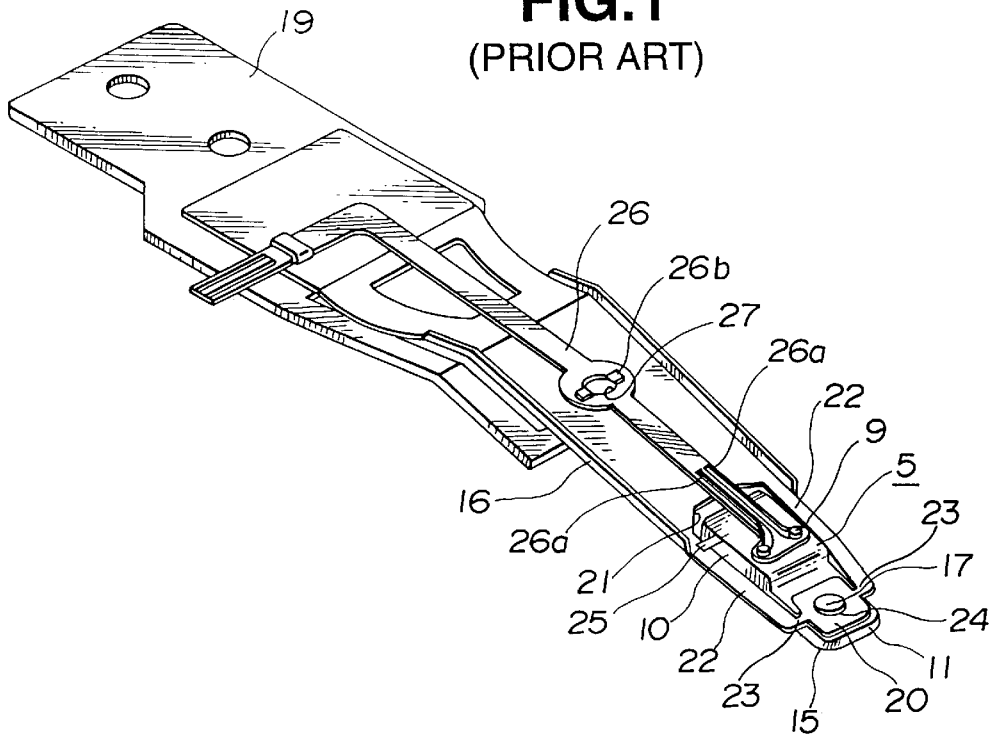
FIG. 1 is a perspective view when the conventional magnetic head device is viewed from the slidable contact surface side towards the magneto-optical disc.
Figure 2:
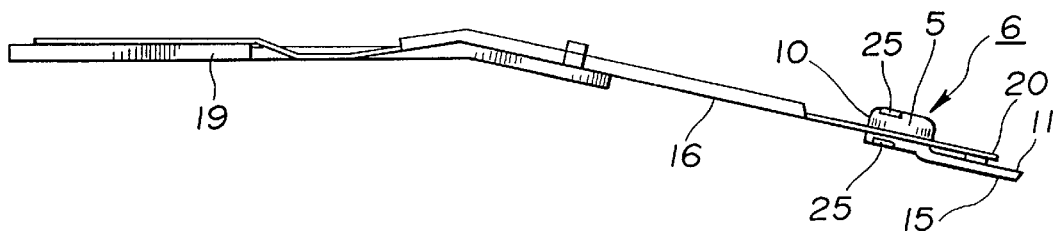
FIG. 2 is a side view of the magnetic head device shown in FIG. 1.
Figure 3:
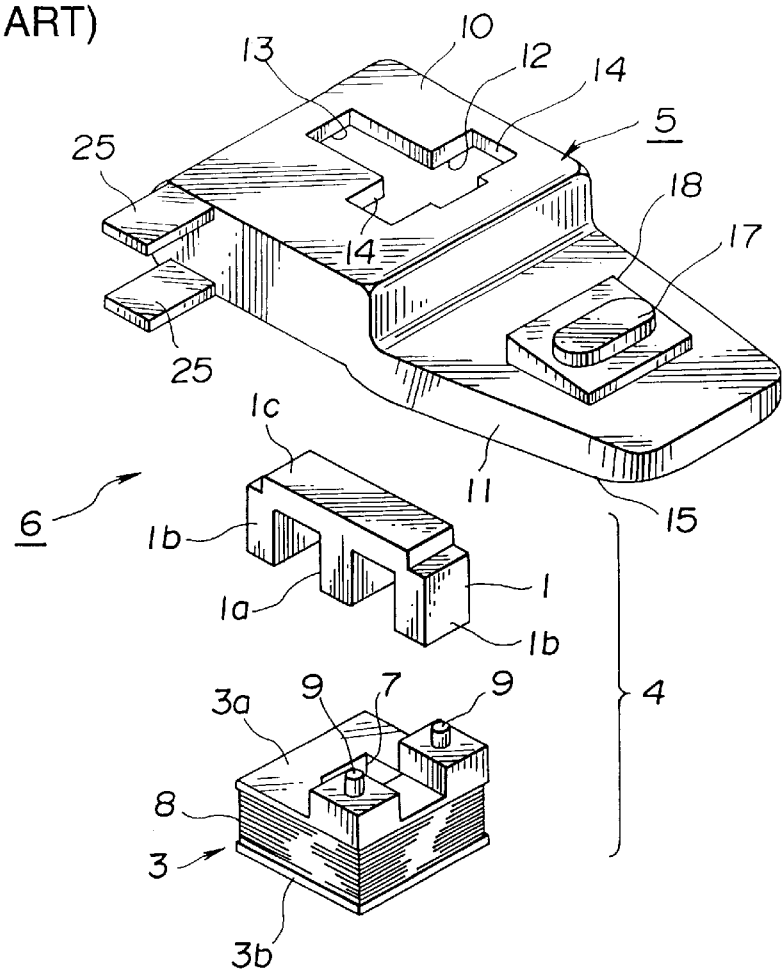
FIG. 3 is an exploded perspective view of the conventional magnetic head.
Figure 4:
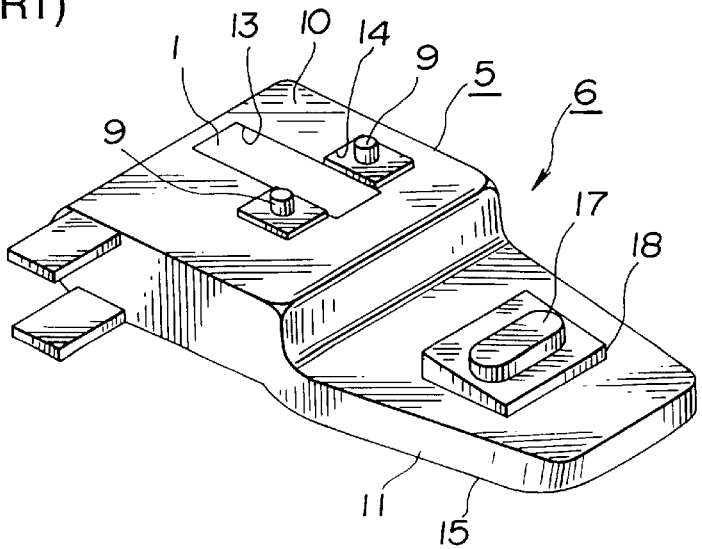
FIG. 4 is a perspective view of the conventional magnetic head.
Figure 5:
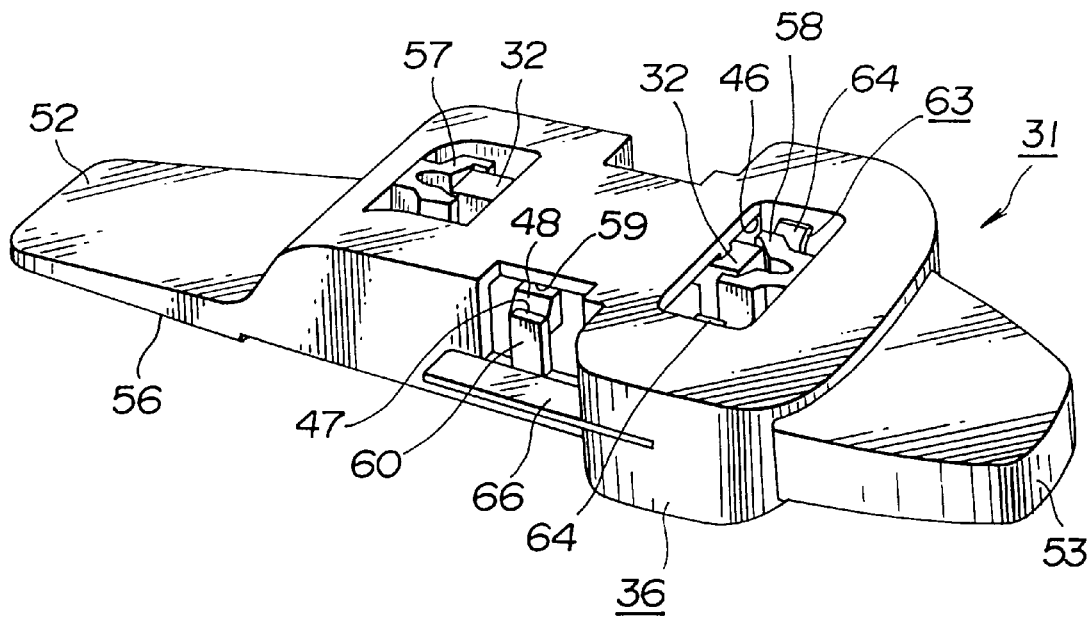
FIG. 5 is a perspective view of the upper surface side of a magnetic head according to this invention.
Figure 6:
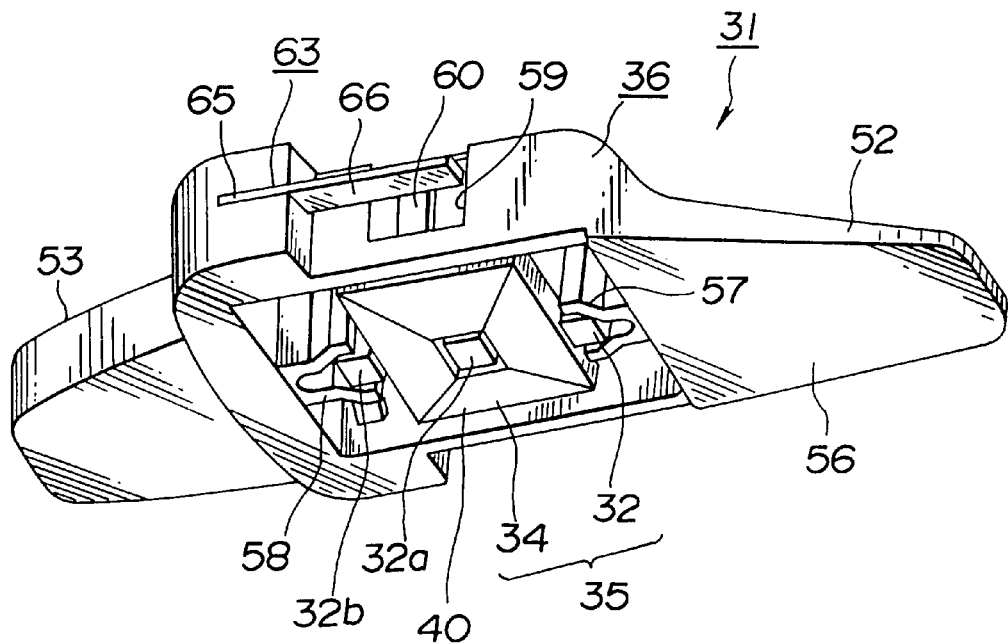
FIG. 6 is a perspective view when the magnetic head shown in FIG. 5 is viewed from the slidable contact surface side towards the magneto-optical recording medium.

Further, the magnetic head 31 includes, as shown in FIGS. 5 and 6, a magnetic head element 35 having a magnetic core 32 and a bobbin 34 on which a coil 33 is wound, and a slidable contact body 36 to which the magnetic head element 35 is attached.

Figure 7:
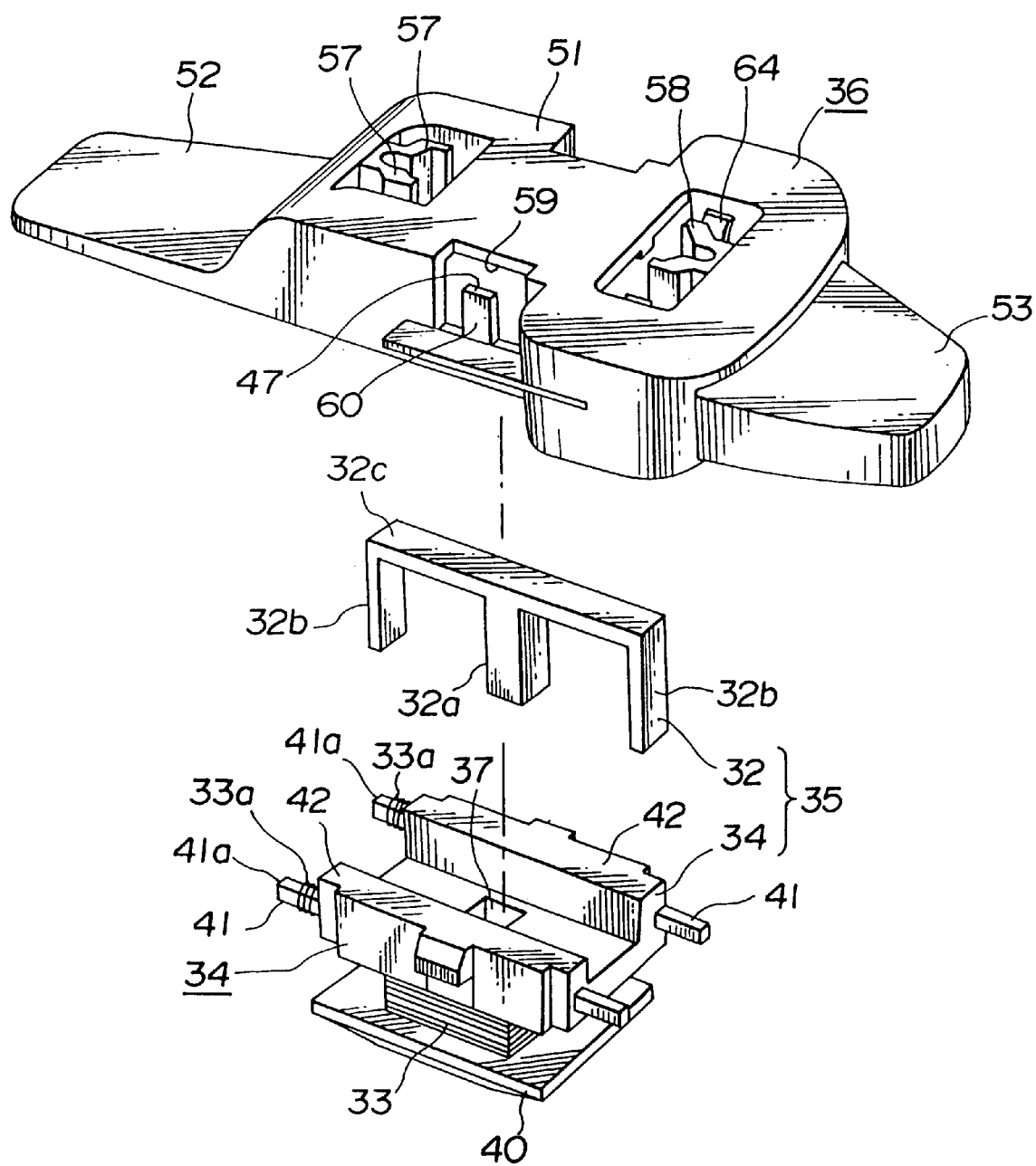
FIG. 7 is an exploded perspective view of the magnetic head shown in FIGS. 5 and 6.

The magnetic core 32 constituting the magnetic head element 35 is formed by a magnetic material such as ferrite, etc., and includes, as shown in FIG. 7, a center magnetic pole core 32a, a pair of side magnetic pole cores 32b, 32b provided on the both sides of the center magnetic pole core 32a, and a connecting portion 32c connecting base end sides of these magnetic pole cores 32a, 32b, 32b so that the entirety thereof is substantially E-shaped. The center magnetic pole core 32a of the magnetic core 32 is formed so as to take a length longer than those of side magnetic pole cores 32b, 32b in such a manner that the front end portion thereof is slightly projected from the front end portions of the side magnetic pole cores 32b, 32b.

Figure 8:
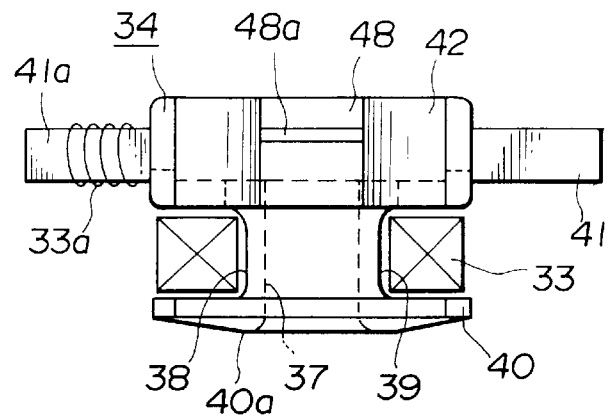
FIG. 8 is a front view of a bobbin constituting the magnetic head according to this invention.
Figure 9:
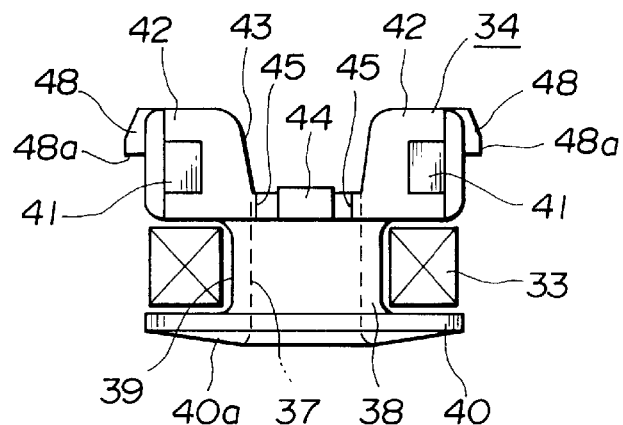
FIG. 9 is a right side view of the bobbin shown in FIG. 8.

Moreover, the bobbin 34 constituting the magnetic head element 35 along with the magnetic core 32 is formed by molding a synthetic resin material such as liquid crystal polymer or polyphenylene sulphide, etc. in which molding of extremely high accuracy can be made, and includes, as shown in FIGS. 7, 8, 9 and 10, a bobbin body 38 provided at the center portion thereof with an insertion hole 37 into which the center magnetic pole core 32a of magnetic core 32 is inserted. At the outer circumferential side of the bobbin body 38, there is provided a coil winding portion 39 formed so as to take a recessed form in a manner to surround the insertion hole 37. At one end side of the bobbin body 38, a flange portion 40 projecting in a direction perpendicular to the axis direction of the insertion hole 37 is integrally formed. An end surface 40a of the flange portion 40 serves as a slidable contact surface side to the magneto-optical disc. Accordingly, the end surface 40a of the flange portion 40 is as shown in FIGS. 8 and 9 such that the central portion is formed as swollen curved surface in order that it can be smoothly in slidable contact with the principal surface of the magneto-optical disc rotationally operated.

Figure 10:
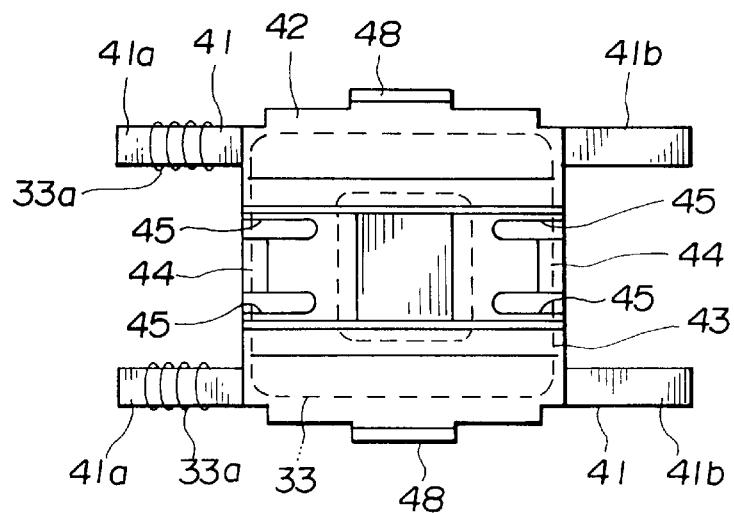
FIG. 10 is a bottom view of the bobbin shown in FIG. 8.

At the other end side of the bobbin body 38, as shown in FIGS. 9 and 10, there are projected a pair of supporting portions 42, 42 for supporting a pair of coil connection terminals 41, 41 formed by a conductive material such as phosphor bronze, etc. These supporting portions 42, 42 are projected in parallel in a manner opposite to each other in a direction perpendicular to the axial direction of the insertion hole 37. Further, a pair of coil connecting terminals 41, 41 are integrally attached to these supporting portions 42, 42 in such a manner that they are embedded into these supporting portions 42, 42 with the both end portions thereof being projected from the supporting portions 42, 42.

Meanwhile, when the bobbin 34 is molded by metal mold device, a pair of coil connection terminals 41, 41 are disposed within metal mold and are integrally attached at the same of molding of the supporting portions 42, 42, and are attached to the supporting portions 42, 42 by so called insert molding.

One end portion projected from the supporting portions 42, 42 of the coil connection terminals 41, 41 are used as a coil connection portion 41a where a connection terminal 33a (of the coil 33 wound on a coil winding portion 39) is wound and connected. The other end portion is used as a connection terminal portion 41b electrically in contact with a power supply terminal provided integrally with the slidable contact body 36 which will be described later.

Further, the connection terminal 33a of the coil 33 wound on the coil winding portion 39 of the bobbin 34 is wound several times on the coil connection portions 41a of the coil connection terminals 41, 41 (as shown in FIG. 10) so that it is electrically connected thereto. In order to realize reliable electric connection between the connection terminal 33a of the coil 33 and the coil connection portion 41a, the connection terminal 33a is connected to the coil connection portion 41a by using a conductive bond or solder.

A recess-shaped portion constituted by providing, in a projected manner, the pair of supporting portions 42, 42 on the other end side of the bobbin body 38 so that they are opposite to each other is caused to serve as a fitting portion '43 of the magnetic core 32. At the both ends of this fitting portion 43, there are formed core supporting portions 44, 44 for the supporting magnetic pole core 32 attached by inserting the center magnetic pole core 32*a* into the insertion hole 37. These core supporting portions 44, 44 are as shown in FIG. 10 such that a pair of slots 45, 45 are bored at the both sides so that the front end sides thereof are caused to be resiliently displaceable with the joining portion side to the bobbin body 38 acting as a fulcrum. Namely, these core supporting portions 44, 44 serve to limit the insertion direction of the center magnetic pole core 32*a* such that when the magnetic pole core 32 with which processing accuracy cannot be sufficiently obtained is attached to the bobbin 34, they are pressed by the connection portion 32*c* of the magnetic pole core 32 and is therefore elastically deformed so that the center magnetic pole core 32*a* can be securely inserted into the insertion hole 37.

Moreover, at one side of the upper end sides of the supporting portions 42, 42, there are provided engagement pawl pieces 48, 48 serving as engagement portions which are relatively engaged with an engagement step portion 47 serving as a portion to be engaged provided within the attachment hole 46 when the bobbin 34 is attached so as to fit it into the attachment hole 46 of the magnetic head element 35 provided at the slidable contact body 36. These engagement pawl pieces 48, 48 are formed in a manner extending in the axial direction of the insertion hole 37 provided at the bobbin 34, and pawl portions 48*a*, 48*a* are provided in a projected manner at one side of the front end side thereof. These pawl portions 48*a*, 48*a* are formed so as to form an acute angle such that they are tapered toward the front end side.

The slidable contact body 36 in which the magnetic core 32 and the bobbin 34 constituting the magnetic head element 35 are attached is formed by molding the synthetic resin material such as liquid crystal polyester of non-conductive property, etc. as shown in FIGS. 7, 11, 12 and 13. The slidable contact body 36 includes an attachment portion 51 for the magnetic head element 35 at the central portion thereof, wherein there is provided, in a projected manner, a slidable contact portion 52 slidably in contact with the principal surface of the magneto-optical disc from one end side of the attachment portion 51. At the other end side opposite to one end side where the slidable contact portion 52 is projected, a slidable contact attitude limiting portion 53 is projected. This slidable contact attitude limiting portion 53 serves as the portion in contact with a slidable contact attitude control arm for controlling the slidable contact attitude with respect to the magneto-optical disc when the magnetic head 31 is constituted as a magnetic head device as described later and is caused to be slidably in contact with the magneto-optical disc.

Figure 12:
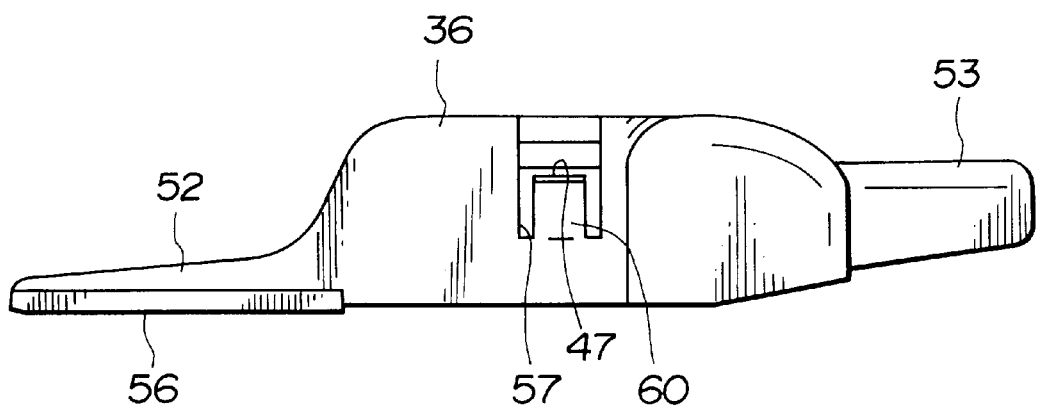
FIG. 12 is a front view of the slidable contact body.
Figure 14:
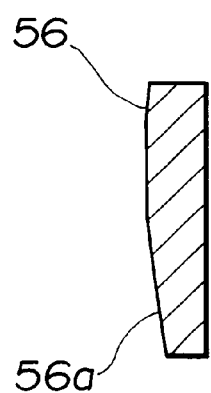
FIG. 14 is a cross sectional view taken along the IVX—IVX line of FIG. 13.

The slidable contact portion 52 is positioned, as shown in FIG. 12, at the opening end side of the attachment hole 46 provided at the attachment portion 51 and is projected from one end of the attachment portion 51. At a slidable contact surface 56 slidably in contact with the principal surface of the magneto-optical disc of the slidable contact portion 52, there is provided, as shown in FIG. 14, an inclined surface 56*a* at the side opposite to the rotation direction of the magneto-optical disc when the magnetic head 31 is caused to be slidably in contact with the circumferential surface of the magneto-optical disc. By providing the inclined surface 56*a*, it is possible to guarantee smooth slidable contact when the magneto-optical disc and the inclined surface 56 are relatively slidably in contact with each other. Moreover, the slidable contact portion 52 is formed in such a manner to allow the slidable contact surface 56 to be slightly projected from the surface opposite to the principal surface of the magneto-optical disc of the attachment portion 52 so that it is caused to be securely slidably in contact with the principal surface of the magneto-optical disc.

Figure 11:
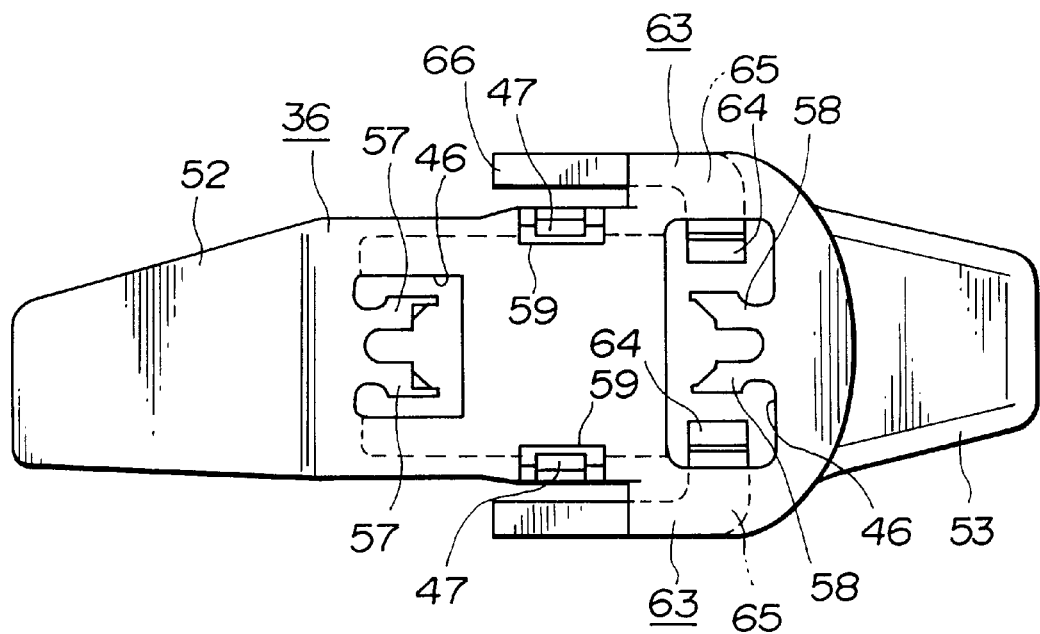
FIG. 11 is a plan view of a slidable contact body constituting the magnetic head according to this invention.
Figure 13:
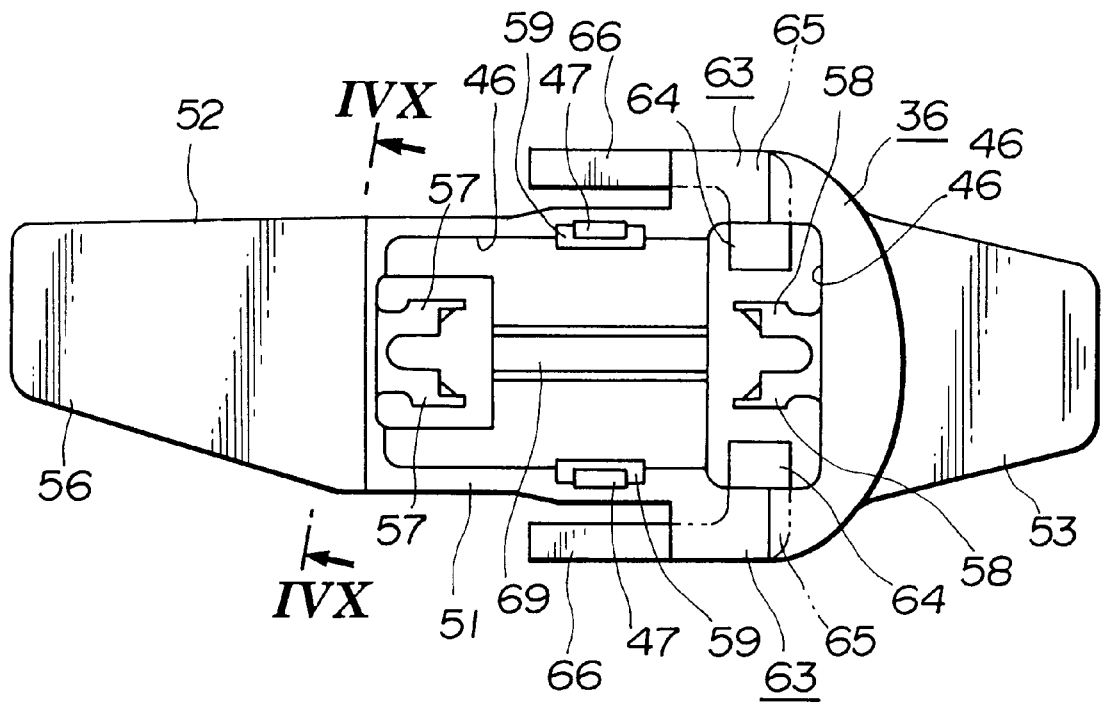
FIG. 13 is a bottom view of the slidable contact body.

At the attachment portion 51 provided at the slidable contact body 52, there is provided an attachment hole 46 attached in such a manner that the magnetic core 32 and the bobbin 34 are fitted. This attachment hole 46 is formed as a recess-shaped structure having a bottom where the surface side slidably in contact with the magneto-optical disc is formed as an opening portion 46*a*. At respective surfaces opposite to each other in the length direction of the attachment hole 46, there are provided, as shown in FIGS. 11 and 13, pairs of first and second holding pieces 57, 57 and 58, 58 for holding the side magnetic pole cores 32*b*, 32*b* provided at the both sides of the magnetic core 32 inserted into the attachment hole 46. These holding pieces 57, 57 and 58, 58 are projected from the surfaces opposite to each other in the length direction of the attachment hole 46 in such a manner that they are opposite to each other. Spacings between respective pairs of holding pieces 57, 57 and 58, 58 are caused to be narrower than the thickness of the magnetic core 32. These holding pieces 57, 57 and 58, 58 compression-hold the side magnetic pole cores 32*b*, 32*b* of the magnetic core 32 to be inserted thereinto.

Figure 15:
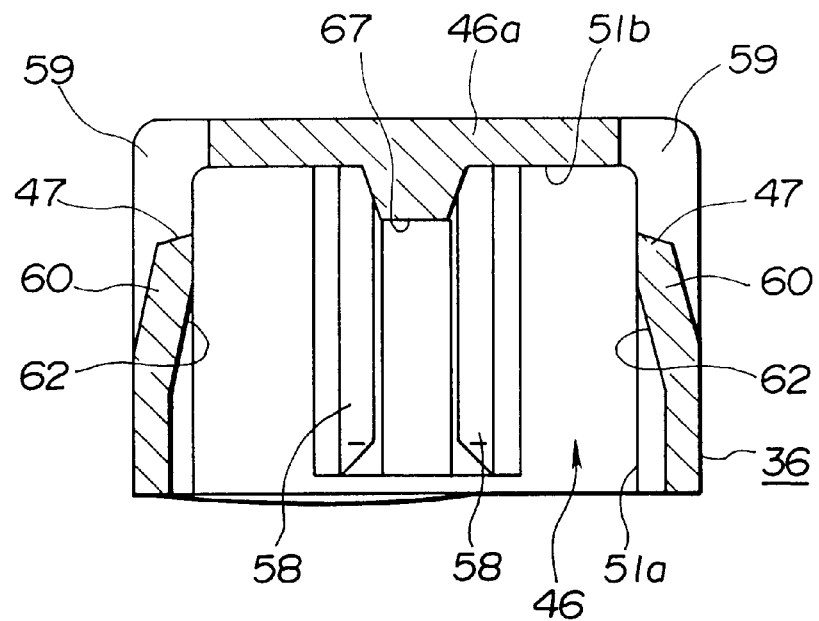
FIG. 15 is a cross sectional view of FIG. 13.

Moreover, at respective surfaces opposite to each other in the length direction perpendicular to the surface on which the first and second holding pieces 57, 57 and 58, 58 of the attachment hole 46 are projected, there are provided, as shown in FIGS. 11 and 15, the engagement step portions 47, 47 serving as engaged portions in which the engagement pawls 48*a*, 48*a* of the engagement pawl pieces 48, 48 provided at the bobbin 34 inserted into the attachment hole 46 are engaged with each other. These engagement step portions 47, 47 are formed, as shown in FIG. 12, at the upper end surface portions of elastic displacement pieces 60, 60 formed by boring cut grooves 59, 59 formed channel-shaped over the intermediate portion from the upper surface side of the slidable contact body 52 which is the bottom portion 46*a* side of the attachment hole 46 at the surfaces opposite to each other in the length direction of the attachment hole 46. Namely, the engagement step portions 47, 47 are formed by the cut grooves 59, 59 bored at the surfaces opposite to each other in the length direction of the attachment hole 46, and are constituted by a portion of the cut grooves 59, 59. The surfaces which are relatively engaged with the engagement pawls 48*a*, 48*a* of the engagement step portions 47, 47 constituted by a portion of the cut grooves 59, 59 are caused to be surfaces of the acute angle corresponding to the engagement pawls 48*a*, 48*a*.

In order to form the engagement step portions 47, 47, the upper end side where the engagement step portions 47, 47 of the elastic displacement pieces 60, 60 formed by boring the cut grooves 59, 59 are formed are inclined so that they are projected inwardly of the attachment hole 46 as shown in FIG. 15. The inclined surfaces opposite to each other of these elastic displacement pieces 60, 60 are in contact with a portion of the outer circumferential portion of the bobbin 34 inserted into the attachment hole 46, and are caused to serve as insertion guide portions 62, 62 which guide the insertion direction and the insertion position of the bobbin 34.

Moreover, within the attachment hole 46, there are provided a pair of power supply terminals 63, 63 formed by a conductive material such as phosphor bronze or BeCu, etc. electrically in contact with the connection terminal portions 41*b*, 41*b* of the coil connection terminals 41, 41 provided at the bobbin 34 inserted into the attachment hole 46 and adapted for carrying out power supply to the coil 33 wound on the bobbin 34. These power supply terminals 63, 63 are provided at positions which can become into contact with the connection terminal portions 41b, 41b of the coil connection terminals 41, 41 attached at the bobbin 34 when the bobbin 34 is attached to the attachment hole 46, and are provided, as shown in FIG. 13, at the side surfaces opposite to each other of the attachment hole 46 under the state where they are positioned at the side where the first holding pieces 57, 57 are projected.

Figure 16:
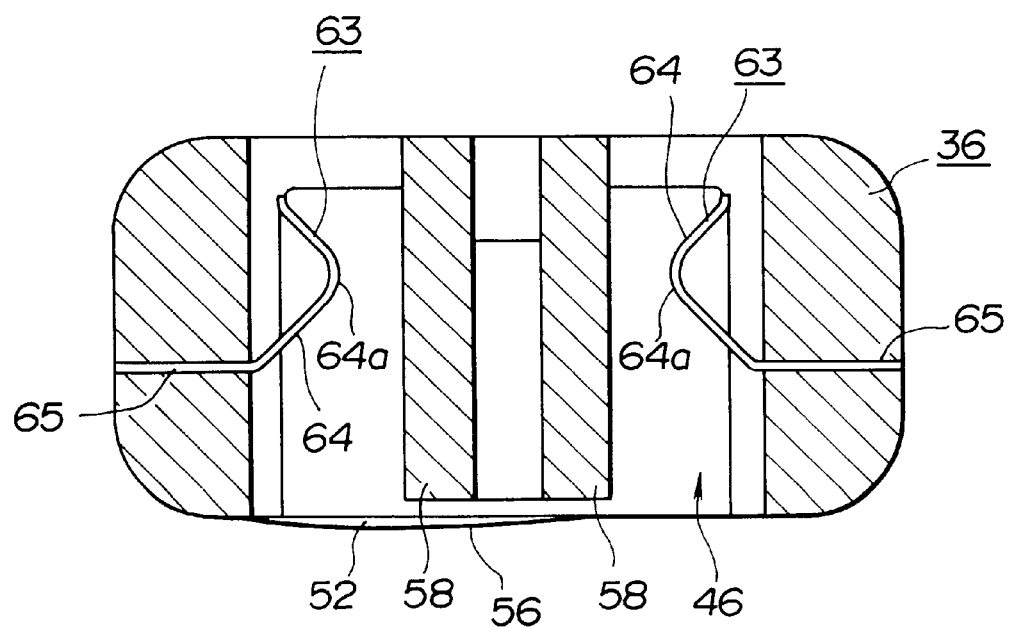
FIG. 16 is a cross sectional view of FIG. 13.

The power supply terminal 63 includes, as shown in FIG. 16, bending portions 64 projected into the attachment hole 46 and elastically in contact with the coil connection terminals 41, 41, and attachment portions 65 attached to the slidable contact body 36, wherein the bending portions 64 and the attachment portions 65 are integrally formed. The bending portions 64 of the power supply terminals 63 are bent in such a manner to swell the central portions, and the swollen portions are caused to serve as an electric contact portion 64a to the coil connection terminals 41. Moreover, the bending portions 64 are bent from one end portion of the attachment portions 65 along the direction in which the bobbin 34 is inserted into the attachment hole 46.

Further, the power supply terminals 63 are integrally attached to the slidable contact body 36 in molding the slidable contact body 36. Namely, the power supply terminals 63 are disposed in advance within the metal mold of the metal mold device for molding the slidable contact body 36. Thus, the power supply terminals 63 are integrally attached to the slidable contact body 36 so that it is embedded thereinto. Namely, the power supply terminals 63 are integrally attached to the slidable contact body 36 by insert-molding the power supply terminals 63 thereinto.

A portion of the other end side of each attachment portion 65 embedded within the slidable contact body 36 of the power supply terminal 63 is projected to the side direction of the slidable contact body 36, and is used as an external connection terminal 66.

Meanwhile, at the bending portions 64 in contact with at least the coil connection terminals 41, 41 of the power supply terminals 63, in order to reduce the electric resistance at the time of contact, plating processing which is selected from any one of gold plating processing, nickel plating processing and solder plating processing is implemented thereto. It is desirable for the material used in plating processing to use a material of electric resistance smaller than that of the power supply terminal 63 in order to reduce the electric resistance at the time of contact.

Similarly, in order to reduce the electric resistance at the time of contact, it is desirable to implement plating processing which is selected from any one of gold plating processing, nickel plating processing and solder plating processing also to the connection terminal portions 41b, 41b in contact with the bending portions 64 of the coil connection terminals 41, 41.

Moreover, at the bottom surface 46a of the attachment hole 46, i.e., the internal surface of the top plate side of the slidable contact body, as shown in FIG. 15, there is formed in a swollen manner a magnetic core butting portion 67 such that the front end surface of the center magnetic pole core 32a of the magnetic core 32 attached to the attachment hole 46 is in contact therewith to thereby limit the attachment position with respect to the attachment hole 46 of the magnetic core 32.

The step of assembling the magnetic head 31 constituted as described above will now described, and the assembled magnetic head 31 will be further described.

Figure 17:
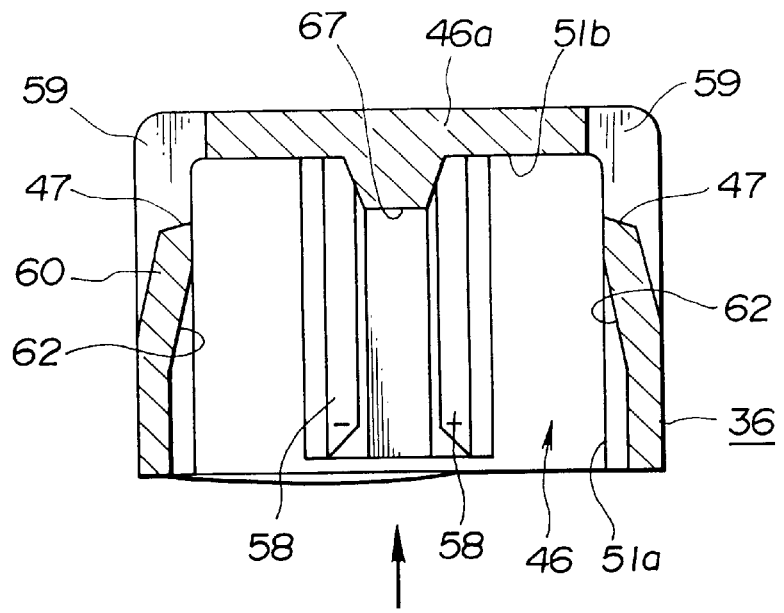
FIG. 17 is a cross sectional view showing an assembly state of the magnetic head.
Figure 17:
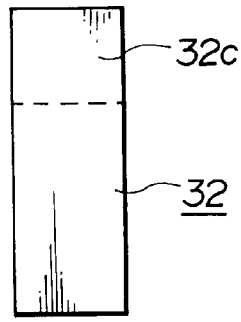
Figure 17:
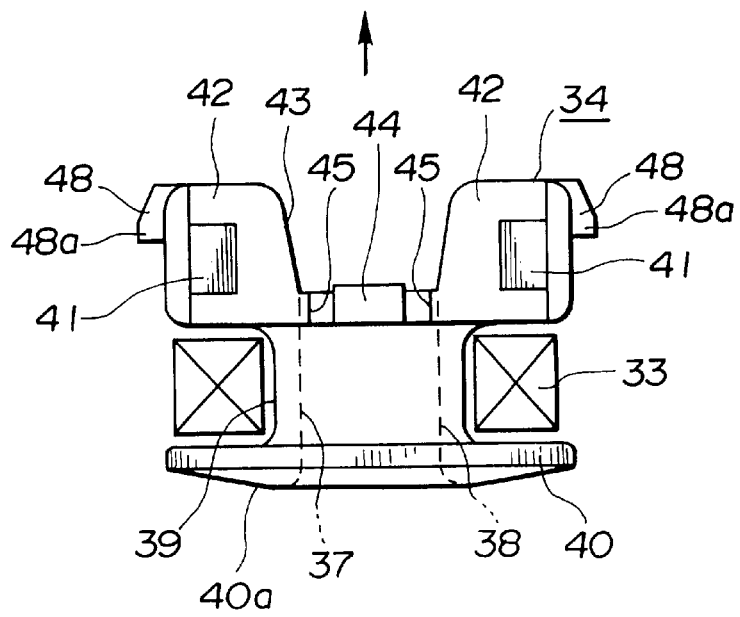

For assembling the magnetic head 31, the magnetic core 32 is attached into the attachment hole 46 of the slidable contact body 36. The magnetic core 32 is inserted, as shown in FIG. 17, into the attachment hole 46 from the opening end 46a opened toward the slidable contact surface side to the magneto-optical disc of the slidable contact body 33 with the connection portion 32c side being as the insertion end. The magnetic core 32 inserted into the attachment hole 46 is held by these holding pieces 57, 57 and 58, 58 as the result of the fact that both end portions of the side magnetic pole core 32b, 32b sides are fitted between the first and second holding pieces 57, 57 and 58, 58. Thus, the magnetic core 32 is provisionally fixed within the attachment hole 46. At this time, with respect to the magnetic core 32, the upper surface of the connection portion 32c is in contact with the magnetic core butting portion 67 so that positional restriction in the insertion direction into the attachment hole 46 is provided.

Then, the bobbin 34 on which the coil 33 is wound is inserted into the attachment hole 46 within which the magnetic core 32 is disposed. The bobbin 34 is inserted into the attachment hole 46 from the opening end 51a by allowing the side where the engagement pawl pieces 48, 48 are projected to be in correspondence with the surface where the engagement step portions 47, 47 of the attachment hole 46 are provided, and by allowing the connection terminal portions 41b, 41b of the coil connection terminals 41, 41 to be in correspondence with the power supply terminals 63, 63 projected within the attachment hole 46. At this time, the center magnetic pole core 32a of the magnetic core 32 is inserted into the insertion hole 37 of the bobbin 34. Further, when the bobbin 34 is inserted into the attachment hole 46, the bobbin 34 is inserted into the attachment hole 46 while being slidably in contact with the outside surface of the side where the coil connection terminals 41, 41 are attached to the insertion guide portions 62, 62 formed on the surfaces opposite to each other of the resilient displacement pieces 60, 60 projected into the attachment hole 46. At this time, the bobbin 34 is inserted into the attachment hole 46 with the outside surface thereof being guided by the insertion guide portions 62, 62, whereby the insertion direction with respect the attachment hole 46 is limited. Accordingly, the bobbin 34 is inserted into the attachment hole 46 in the state where the center magnetic pole core 32a of the magnetic core 32 provisionally fixed and disposed within the attachment hole 46 is precisely inserted into the insertion hole 37.

Figure 18:
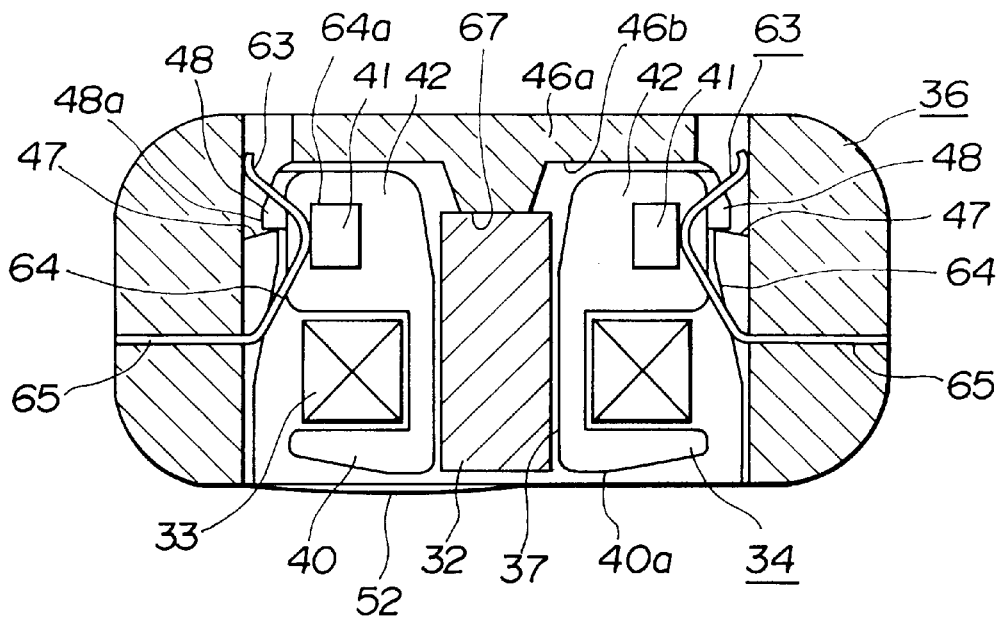
FIG. 18 is a cross sectional view showing the state where the magnetic head element is attached to the slidable contact body.
Figure 19:
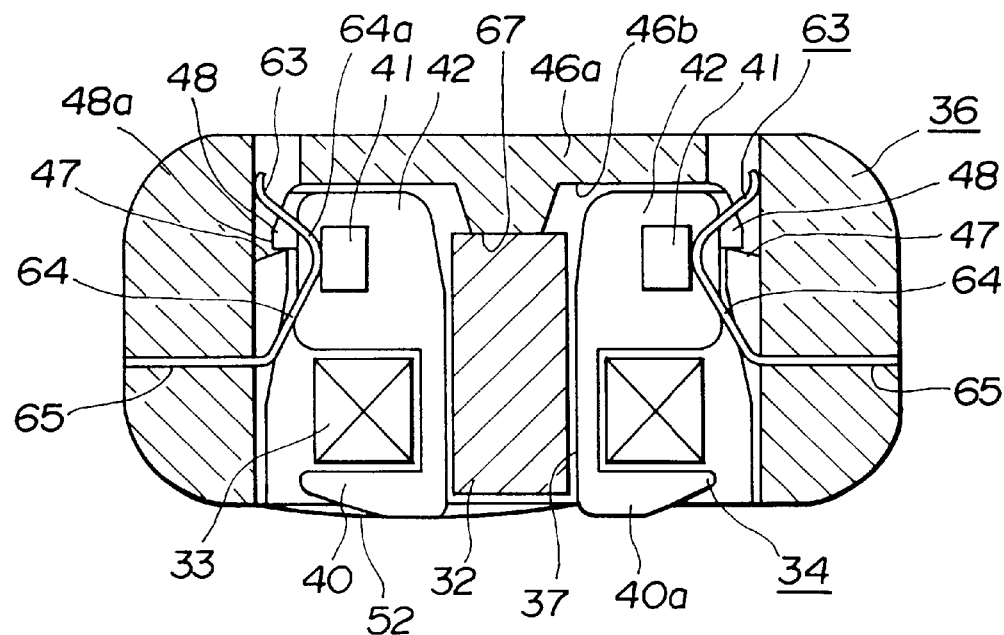
FIG. 19 is a cross sectional view showing another embodiment of the magnetic head according to this invention.

Moreover, when the bobbin 34 is inserted into the attachment hole 46, the elastic displacement pieces 60, 60 are caused to undergo elastic displacement toward the outward direction of the attachment hole 46 by the engagement pawl pieces 48, 48. When the bobbin 34 is further inserted from this and is inserted until the insertion end side comes into contact with the bottom surface 51b of the attachment hole 46, the engagement pawls 48a, 48a of the front ends of the engagement pawl pieces 48, 48 reach the engagement step portions 47, 47 formed at the front ends of the elastic displacement pieces 60, 60. As a result, the elastic displacement pieces 60, 60 are elastically returned. Thus, relative engagement between the engagement pawls 48a, 48a and the engagement step portions 47, 47 is realized. Then, as shown in FIG. 18, the bobbin 34 is positioned within the attachment hole 46 with the flange portion 40 in which the central portion of the end surface 40a is swollen and formed being faced to the surface side opposite to the magneto-optical disc of the slidable contact body 36, and is then attached thereto.

Further, when the bobbin 34 is attached within the attachment hole 46, the connection terminal portions 41b of the coil connection terminals 41, 41 come into pressure-contact with the power supply terminals 63, 63 projected into the attachment hole 46. Thus, electric connection therebetween is provided. Since these power supply terminals 63, 63 are formed by the conductive material having elasticity such as phosphor bronze, etc. and the bending portions 64, 64 greatly projected into the attachment hole 46 having elasticity (resiliency) are in contact with the connection terminal portions 41b, 41b, the former are in pressure-contact with the latter with an elastic force being given to the connection terminal portion 41b. Thus, reliable electric contact can be realized.

Since the magnetic head 31 is assembled in a manner as described above only by successively inserting the magnetic core 32 and the bobbin 34 on which the coil 33 is wound into the attachment hole 46, it is unnecessary to use bond in order to fix the magnetic core 32 and the coil 33 onto the slidable contact body 36. Therefore, assembly is extremely easy. Moreover, since the attachment position with respect to the slidable body 36 of the magnetic head element 35 can be determined by the relative engagement position between the engagement pawls 48a, 48a and the engagement step portions 47, 47, it is possible to precisely and easily carry out determination of attachment position accuracy.

Further, with respect to connection between the coil connection terminals 41, 41 provided at the bobbin 34 and the power supply terminals 63, 63, soldering etc. is not required. Accordingly, assembly of the magnetic head 31 becomes extremely simple.

Meanwhile, in the above-described magnetic head 31, the bobbin 34 is attached into the attachment hole 46 in such a manner that the end surface 40a of the flange portion 40 will then be not projected from the attachment hole 46. Accordingly, when this magnetic head 31 is affixed on the magneto-optical disc recording/reproducing apparatus and is caused to be slidably in contact with the magneto-optical disc, only the slidable contact portion 52 of the slidable contact body 36 positioned at the peripheral edge of the attachment hole 46 will be slidably in contact with the main surface of the magneto-optical disc.

In this example, the bobbin 34 may be of a structure such that the end surface 40a of the flange portion 40 is attached into the attachment hole 46 so as to become flush with the opening end of the attachment hole 46 and the end surface 40a of the flange portion 40 is caused to be slidably in contact with the principal surface of the magneto-optical disc along with the slidable contact portion 52. Moreover, only the end surface 40a of the flange portion 40 may be slidably in contact with the principal surface of the magneto-optical disc.

It should be noted that it is necessary that when attached into the attachment hole 46, the magnetic core 32 is formed at a size such that the front end portions of respective magnetic pole cores 32a, 32b are not projected from the attachment hole 46, or are attached so that they are not projected from the attachment hole 46. This prevents the magnetic core 32 of high hardness such as ferrite, etc. from coming into contact with the magneto-optical disc and damaging the magneto-optical disc.

Figure 20:
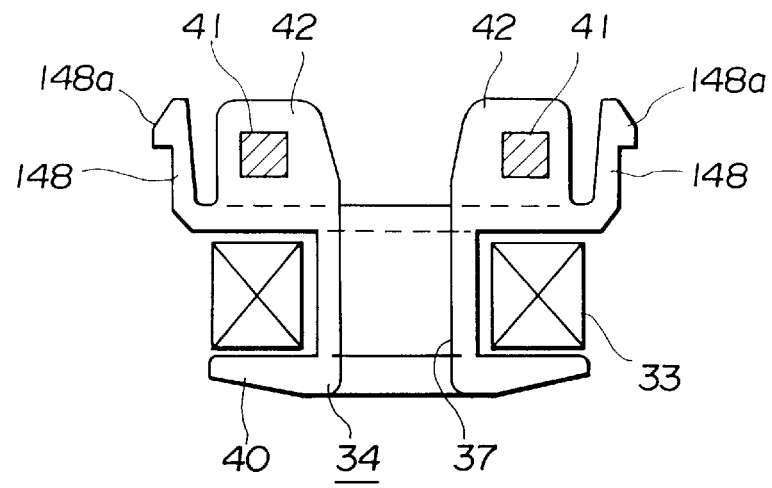
FIG. 20 is a front view showing another example of the bobbin constituting the magnetic head according to this invention.

While the bobbin 34 constituting the abovedescribed magnetic head 31 is such that the engagement pawl pieces 48, 48 are provided in a projected manner at portions of the supporting portions 42, 42 to which the coil connection terminals are integrally attached, it may be formed independently of the supporting portions 42, 42 as shown in FIG. 20. Namely, engagement pawl pieces 148, 148 are projected along the axial direction of the attachment hole 46 from the other end portion opposite to one end portion at which the flange portion 40 of the bobbin body 38 is provided, and the engagement pawls 48a, 48a are provided toward the outside at the front end thereof. In the case of the engagement pawl pieces 148, 148 formed in this way, since the quantity of projection from the bobbin body 38 becomes great, a large elastic displacement quantity can be obtained. Accordingly, in attaching the bobbin 34 into the attachment hole 46, relative engagement between the engagement pawl pieces 148, 148 and the engagement step portions 47, 47 provided within the slidable contact body 36 becomes easy.

Figure 21:
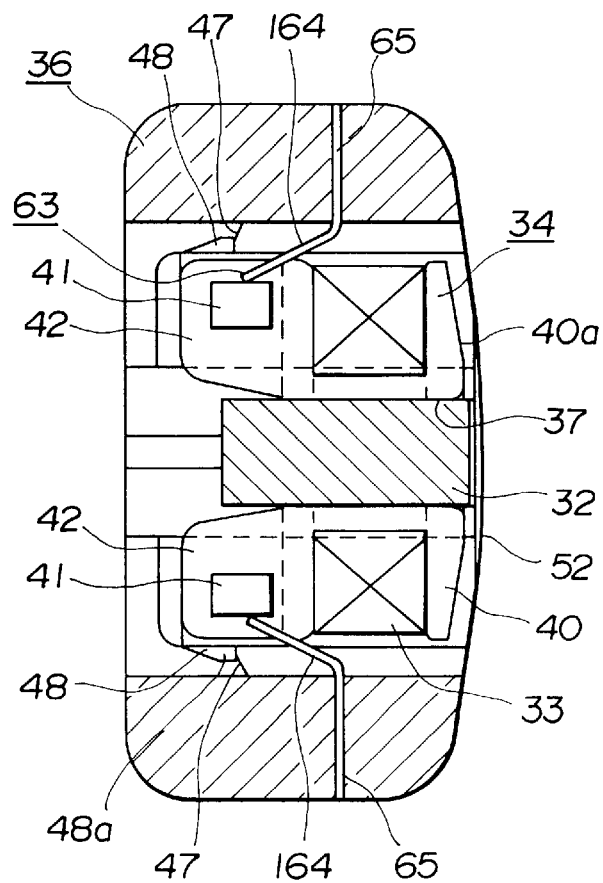
FIG. 21 is a cross sectional view showing a further embodiment of the magnetic head according to this invention.

Moreover, portions 164 in contact with the coil connection terminals 41, 41 of the power supply terminals 63, 63 provided within the attachment hole 46 of the slidable contact body 36 may be bent linearly (in a line shape) without curving it toward the insertion direction into the attachment hole 46 on the bobbin 34 as shown in FIG. 21. The power supply terminals 63, 63 formed by linearly bending the contact portions 164 in this way can be easily formed, and manufacturing thereof becomes easy.

Figure 22:
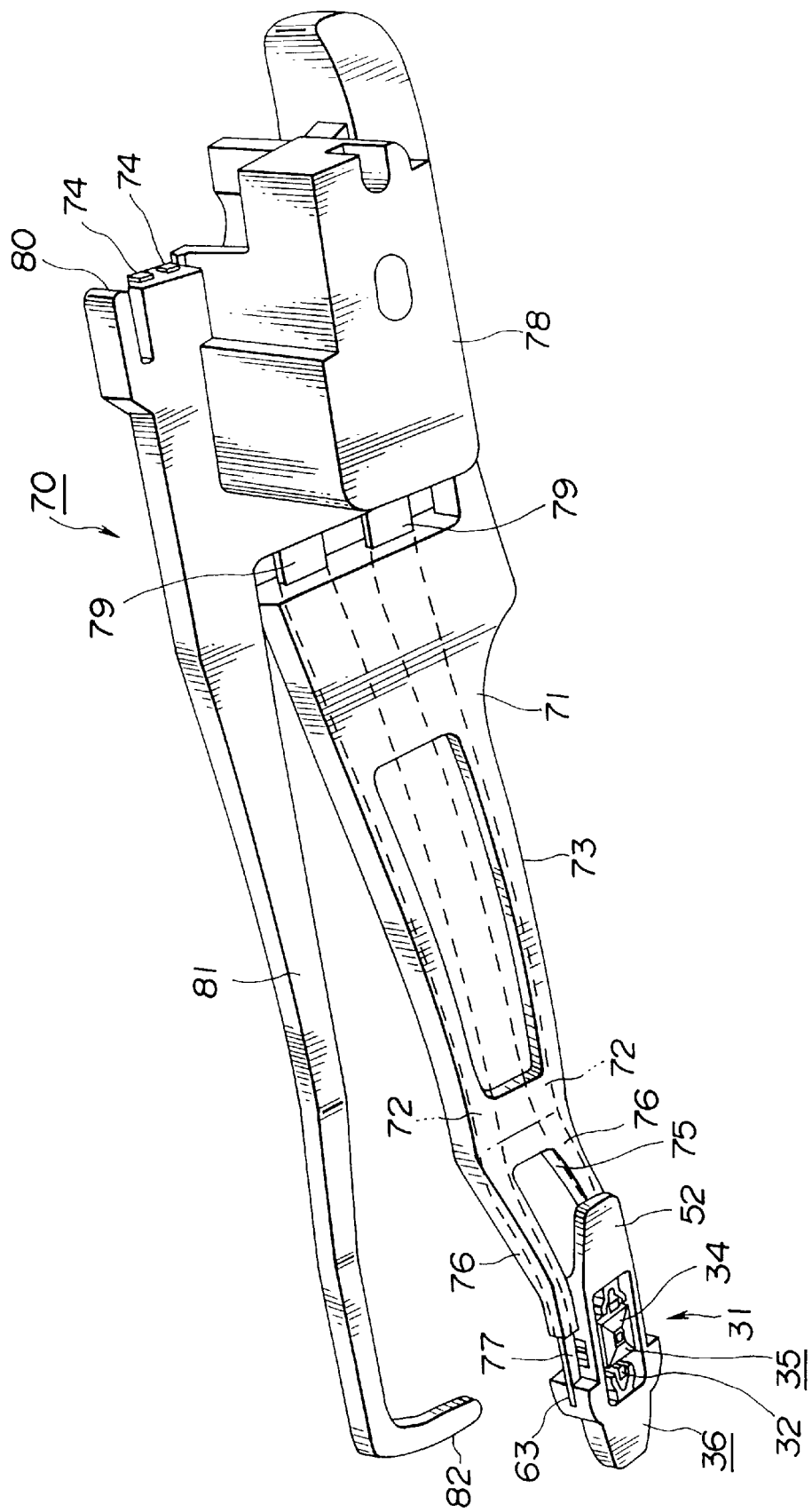
FIG. 22 is a perspective view when magnetic head device according to this invention is viewed from the slidable contact surface to the magneto-optical recording medium.
Figure 23:
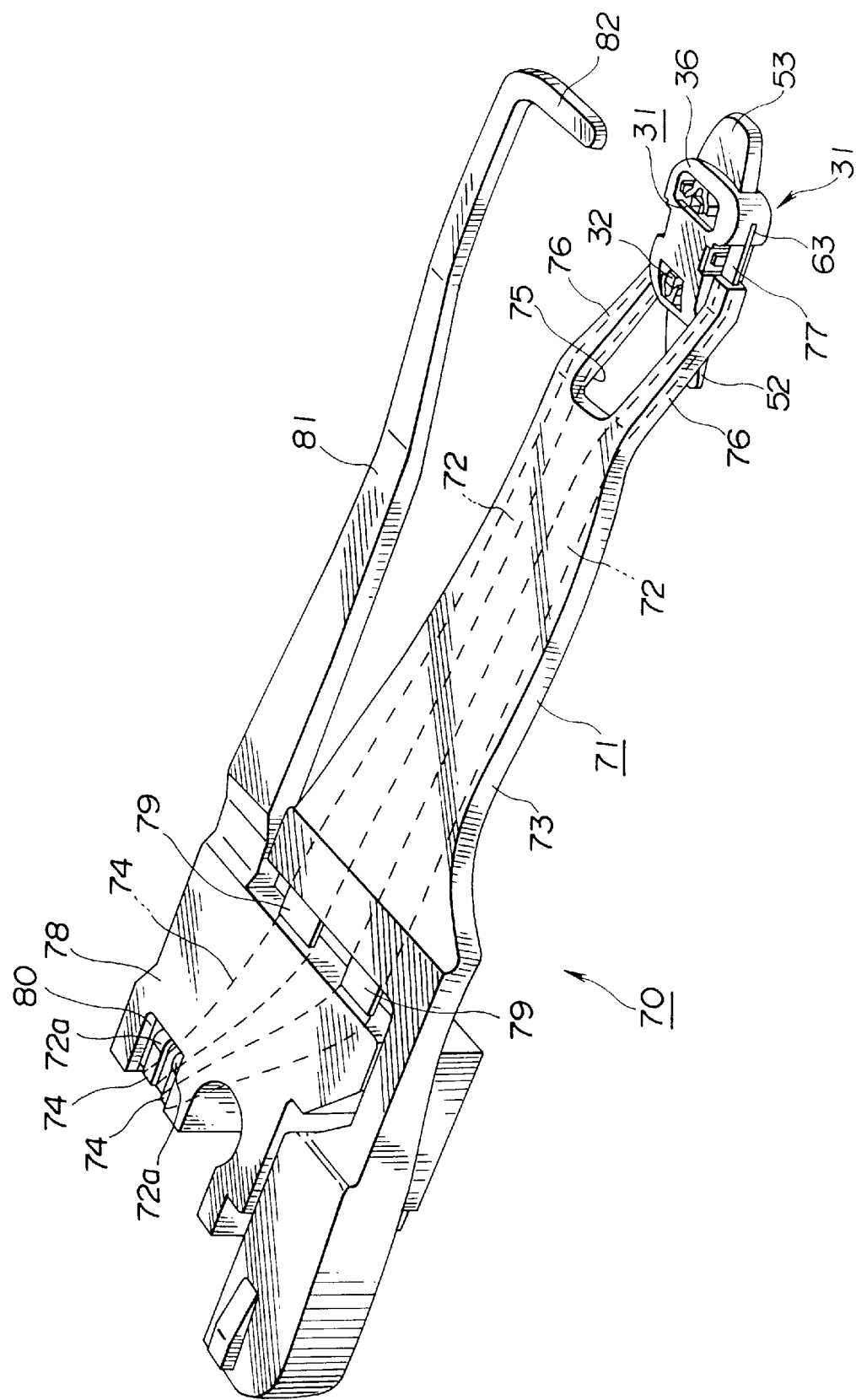
FIG. 23 is a perspective view from the upper surface side of the magnetic head device according to this invention.

When assembled into the magneto-optical disc recording/reproducing apparatus, the magnetic head constituted as described above is supported by a supporting body 71 for elastically supporting it so that the slidable contact body 36 to which the magnetic head element 35 is attached is slidably in contact with the principal surface of the magneto-optical disc to thereby constitute a magnetic head device 70 as shown in FIGS. 22 and 23.

The supporting body 71 for supporting the slidable contact body 36 is composed, as shown in FIGS. 22 and 23, of a pair of plate-shaped conductive elastic bodies 72, 72 in which the power supply terminals 63 (integrally attached to the slidable contact body 36 formed by molding synthetic resin) are formed at the front end side, and a resin body 73 integrally molded at the outer periphery of these elastic bodies 72, 72.

The elastic body 72 constituting the supporting body 71 has conductive property and is formed by a leaf spring of metal such as phosphor bronze or BeCu, etc. having a sufficient elastic force. At one end side of the elastic body 72, there is integrally formed the power supply terminal 63 also functioning as the attachment portion of the slidable contact body 26 to which the slidable contact body 36 formed by molding synthetic resin is integrally attached. Moreover, at the other end side of the elastic body 72, there is formed an external connection terminal portion 74 to which an external information signal recording control circuit is electrically connected. The information signal recording control circuit (not shown) supplies a drive current in dependency upon an information signal to be recorded to the coil 33 wound on the bobbin 34 of the magnetic head 31.

Moreover, the resin body 73 is formed integrally with the elastic bodies 72, 72. The front end side portion of the elastic body 72 at which the power supply terminal 63 is provided and the other end side portion at which the external connection terminal portion 74 are exposed to the outside. The resin body 73 is molded from synthetic resin material such as liquid crystal polyester of non-conductive property at the outer periphery of the intermediate portions of the pair of elastic bodies 72, 72 disposed substantially in parallel to each other.

As the result of the fact that the resin body 73 is integrally molded at the intermediate portions of the pair of elastic bodies 72, 72, positional relationship therebetween is restricted. Moreover, the portions covered by the resin body 73 are caused to have rigidity, and as the result of this hardening, the elastic bodies 72, 72 are held by the resin body 73 so that easy elastic displacement is restricted.

Moreover, at the side where the power supply terminal 63 of the resin body 73 is projected, there is provided a recessed portion 75 in which the slidable contact body 36 of the magnetic head 31 is positioned. The portions extending on the both sides of the recessed portion 75 are caused to serve as supporting arm portions 76, 76 of the slidable contact body 36. By molding the synthetic resin material so as to include the power supply terminals 63, 63 of the front end side portions of the pair of elastic bodies 72, 72 projected toward the front end sides of these supporting arm portions 76, 76, the slidable contact body 36 is formed to be integrally supported by the supporting body 71.

The slidable contact body 36 is as shown in FIG. 22 such that the both sides opposite to each other where the pair of power supply terminals 63, 63 are positioned are supported by the front end portions of the pair of elastic bodies 72, 72 in such a state that the slidable contact portion 52 side is positioned within the recessed portion 75. The position supported by the pair of elastic bodies 72, 72 of the slidable contact body 36 is the position corresponding to substantially the center of gravity position of the slidable contact body 36 under the state where the magnetic head element 35 is attached as previously described. In a manner as stated above, when the portion in the vicinity of the center of gravity position is supported by the pair of elastic bodies 72, 72 constituting the supporting body 71, whereby the slidable contact body 36 is slidably in contact with the magneto-optical disc, even in the case where there is any unevenness on the principal surface of the magneto-optical disc, so the slidable contact body 36 is caused to undergo displacement in upper and lower directions, the slidable contact body 36 can be slidably in contact with the principal surface of the magneto-optical disc in a stable manner following change of shape of the magneto-optical disc. By the provision of the slidable contact body 36 supported in this way, the distance between the magnetic head 31 and the magneto-optical disc can be maintained to be constant at all times, thus making it possible to securely apply an external magnetic field to the magneto-optical disc.

Meanwhile, the front end portions serving as the supporting portion of the slidable contact body 36 of the elastic bodies 72, 72 are faced toward the outward direction without being covered by synthetic resin or the slidable contact body 36. Accordingly, between the front end portions of the pair of supporting arm portions 76, 76 of the supporting body 71 and the slidable contact body 36, a pair of first easily elastically displaceable elastic displacement portions 77, 77 constituted by a portion of the elastic bodies 72, 72. Further, the slidable contact body 36 is permitted to undergo displacement in a thickness direction of the magneto-optical disc perpendicular to the length direction of the supporting body 31 with the pair of first elastic displacement portions 77, 77 being as point of displacement. Accordingly, since when the slidable contact body 36 is slidably in contact with the principal surface of the magneto-optical disc, it is caused to undergo elastic displacement with the first elastic displacement portions 77, 77 being as point of displacement, even in such cases that there is unevenness on the principal surface of the magneto-optical disc, the slidable contact body 36 can be securely kept in contact with the principal surface of the magneto-optical disc while undergoing displacement to follow such unevenness.

Moreover, at the other end side opposite to one end side where the slidable contact body 36 of the supporting body 71 is integrally attached, a fixed portion 78 for fixing the supporting body 71 within the magneto-optical disc recording/reproducing apparatus is integrally provided. This fixed portion 78 is formed by molding the synthetic resin material such as liquid crystal polyester of non-conductive property, etc. similarly to the resin body 73 of the supporting body 71 so as to include the pair of elastic bodies 72, 72 projected toward the other end side of the supporting body 71. At this time, the fixed portion 78 is formed without being continuous to the resin body 73 constituting the supporting body 71, and the portion at which the pair of elastic bodies 72, 72 are faced toward the external direction are formed between the fixed portion 78 and the resin body 73. The portion of the pair of elastic bodies 72, 72 faced between the fixed portion 78 and the elastic body 73 is caused to serve as second elastic displacement portions 79, 79 for the elastically displaceably supporting body 71 with respect to the fixed portion 71. These second elastic displacement portions 79, 79 serve to render the elastic force to the magnetic head 31 supported by the supporting body 71 to allow it to be slidably in contact with the magneto-optical disc.

Accordingly, this magnetic head device 70 is attached within the magneto-optical disc recording/reproducing apparatus in such a manner that the magnetic head 31 is slidably in contact with the magneto-optical disc under the state where the second elastic displacement portions 79, 79 are caused to slightly undergo elastic displacement.

Meanwhile, the external connection terminal portions 74, 74 provided at the other end side of the pair of elastic bodies 72, 72 are formed with respective portions of the elastic bodies 72, 72 being bent so that they are U-shaped, and a bending portion 72a is provided at the intermediate portion thereof. These external connection portions 74, 74 are faced toward the external direction under the state where they are positioned within a cut recessed portion 80 formed on one side of the fixed portion 78 as shown in FIG. 22. Further, these external connection terminal portions 74, 74 are positioned so as to extend on the bottom surface of the cut recessed portion 80, and is compression operated, whereby the bending portion 72a is supported by the bottom surface of the cut recessed portion 80 and is caused to undergo elastic displacement. Accordingly, the external connection terminal portions 74, 74 can be elastically repulsively engaged with connector for external connection which is fitted into the cut recessed portion 80.

In this example, the fixed portion 78 is molded at the same time when the supporting body 71 and the slidable contact body 36 are molded.

Moreover, a slidable contact attitude control arm 81 for limiting the slidable contact attitude with respect to the magneto-optical disc of the slidable contact body 36 slidably in contact with the magneto-optical disc is provided from one end of the fixed portion 78 toward the extending direction of the supporting body 71. This slidable contact attitude control arm 81 is extended, as shown in FIGS. 22 and 23, in parallel to the supporting body 71, thus allowing a limit portion 82 (bent L-shaped) to be opposite to the portion on the slidable attitude limit portion 53 projected toward the other end side of the slidable contact body 36. Further, when the slidable contact body 36 is caused to be slidably in contact with the magneto-optical disc and is caused to undergo elastic displacement with the first elastic displacement portions 77, 77 considered as point of displacement, the slidable contact attitude control arm 81 allows the slidable contact attitude limit portion 53 to come into contact with the limit portion 82 to thereby limit the slidable contact attitude with respect to the magneto-optical disc. Namely, the slidable contact body 36 is subjected to attitude control in such a manner that it is caused to be slidably in contact with the principal surface of the magneto-optical disc in parallel thereto.

Since the magnetic head device 70 constituted as described above simultaneously mold slidable contact body 36 constituting the magnetic head 31, the supporting body 71 for supporting the slidable contact body 36, and the fixed portion 78 through a pair of elastic bodies 72, 72, molding is extremely easy. Further, since there is employed a configuration in which the elastic bodies 72, 72 having conductive property of unitary structure are used as a power supply source to carry out power supply to the coil 33 of the magnetic head 31 through these elastic bodies 72, 72, an independent power supply line for carrying out power supply to the coil 33 becomes unnecessary.

Industrial Applicability

As described above, since the magnetic head according to this invention can be assembled only by fitting the magnetic core and the bobbin on which the coil is wound with respect to the slidable contact body, assembling becomes extremely easy. In addition, since attachment positions of the magnetic core and the bobbin are limited by attaching them to the slidable contact body, it is possible to easily attach the magnetic head element at a precise attachment position.

Moreover, since there is no necessity of using a bond such as a solder, etc. in the case of connecting the coil wound on the bobbin to the terminal for external connection, connection (wiring) between the coil and the external circuit becomes extremely easy.

Further, since the magnetic head device according to this invention uses, as the power supply line, the elastic body having conductive property constituting the supporting body for elastically supporting the slidable contact body to which the magnetic head element is attached, it is possible to simultaneously carry out mechanical and electric connections between the magnetic head and the support body. Accordingly, it is possible to provide the magnetic head device in which the number of parts is reduced and assembly is easy.

What is claimed is:

1. A magnetic head device used for recording of a magneto-optical recording medium and adapted to be, on the magneto-optical recording medium, slidably in contact therewith, the magnetic head device comprising:
   a magnetic head element comprising a core and a bobbin on which a coil is attached;
   a slidable contact body to which the core and the bobbin of the magnetic head element are attached;
   an electrically conductive elastic body for elastically supporting the slidable contact body so that the slidable contact body can be in a sliding position in sliding contact with the magneto-optical recording medium, wherein the elastic body is electrically connected to the coil;
   a supporting body made of resin in which the electrically conductive elastic body is integrally molded, wherein the supporting body supports said electrically conductive elastic body so that the slidable contact body has freedom to move between the sliding position and a position spaced away from the magneto-optical recording medium;
   a regulating section extending from the supporting body in a position for stopping the slidable contact body when said slidable contact body moves away from the sliding position into engagement with the regulating section, thus regulating movement of the slidable contact body in a direction toward the position spaced away from the magneto-optical recording medium from the sliding position without regulating movement of the slidable contact body away from said position spaced away from the magneto-optical recording medium toward said sliding position; and
   a fixed portion, wherein the elastic body includes a first elastic displacement portion formed between the supporting body and the slidable contact body and a second elastic displacement portion formed between the fixed portion and the supporting body, the elastic body is formed by electrically conductive plate-shaped material, the elastic body has a first end and a second end, the elastic body has a first terminal portion formed at the first end, and the first terminal portion is integrally attached to the slidable contact body and is electrically connected to the coil.

2. A magnetic head device as set forth in claim 1, wherein the slidable contact body is supported by the supporting body.

3. A magnetic head device as set forth in claim 1, wherein an attachment hole within which the core and the bobbin are attached is formed in the slidable contact body, and the first terminal portion is attached to the slidable contact body in such a manner that the first terminal portion is projected from the attachment hole.

4. A magnetic head device as set forth in claim 1, wherein the elastic body has a second terminal portion formed at the second end for carrying out connection to an external circuit.

5. A magnetic head device comprising:
   a magnetic head;
   a slidable contact body to which the magnetic head is mounted and which has a slidable contact section for sliding on a magneto-optical recording medium;
   an electrically conductive elastic body connected to the slidable contact body and configured to solely support the slidable contact body so that said slidable contact body can be in a sliding position in sliding contact with the magneto-optical recording medium, wherein the elastic body is electrically connected to the magnetic head;
   a supporting body made of resin in which the electrically conductive elastic body is integrally molded, and configured to allow the electrically conductive elastic body to support the slidable contact body movably between the sliding position and a position spaced away from the magneto-optical recording medium;
   a regulating section extending from the supporting body in a position for stopping the slidable contact body when said slidable contact body moves away from the sliding position into engagement with the regulating section, to regulate movement of the slidable contact body in a direction toward the position spaced away from the magneto-optical recording medium from the sliding position without regulating movement of the slidable contact body away from said position spaced away from the magneto-optical recording medium toward said sliding position.

6. The magnetic head device as claimed in claim 5, wherein the regulating section is integral with the supporting body.

7. The magnetic head device as claimed in claim 6, wherein the supporting body and the regulating section are formed of a synthetic resin material.

8. The magnetic head device as claimed in claim 7, wherein the regulating section has an arm section formed along a direction in which the supporting body extends, and an abutment section at a distal end of the arm section, wherein the abutment section is positioned to engage and stop the slidable contact body when said slidable contact body moves away from the sliding position into engagement with the regulating section.

9. The magnetic head device as claimed in claim 8, wherein the abutment section is formed substantially perpendicularly to the arm section.

10. The magnetic head device as claimed in claim 8, wherein the arm section has a proximal end connected to a proximal end of the supporting body.

11. The magnetic head device as claimed in claim 5, wherein the regulating section and the supporting body are substantially in parallel to each other when the slidable contact body is abutted against the regulating section so that the movement of the supporting body is limited in the direction toward the position spaced away from the magneto-optical recording medium.

12. A magnetic head device comprising:

a magnetic head;

a slidable contact body to which the magnetic head is mounted and which has a slidable contact section for sliding on a principal surface of a magneto-optical recording medium;

an electrically conductive elastic body connected to the slidable contact body and configured to solely support the slidable contact body so that said slidable contact body can be in a sliding position in sliding contact with the principal surface of the magneto-optical recording medium, wherein the elastic body is electrically connected to the magnetic head;

a supporting body made of resin in which the electrically conductive elastic body is integrally molded, and configured to allow the electrically conductive elastic body to support the slidable contact body movably between the sliding position and a position spaced away from the magneto-optical recording medium; and an attitude control arm extended substantially in parallel with the supporting body in a position for stopping the slidable contact body when said slidable contact body moves away from the magneto-optical recording medium into engagement with an end portion of the attitude control arm, thereby causing the slidable contact body to remain substantially parallel to the principal surface of the magneto-optical recording medium by stopping the slidable contact body when the slidable contact body moves sufficiently far away from the principal surface of the magneto-optical recording medium, wherein the attitude control arm is positioned so as not to limit movement of the slidable contact body toward the principal surface of the magneto-optical recording medium.

* * * * *